(12) United States Patent
Nagata et al.

(10) Patent No.: US 8,741,465 B2
(45) Date of Patent: Jun. 3, 2014

(54) BATTERY COOLING STRUCTURE

(75) Inventors: Shuichi Nagata, Toyota (JP); Shuji Nagase, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 702 days.

(21) Appl. No.: 12/451,484

(22) PCT Filed: May 26, 2008

(86) PCT No.: PCT/JP2008/060101
§ 371 (c)(1),
(2), (4) Date: Nov. 13, 2009

(87) PCT Pub. No.: WO2009/004879
PCT Pub. Date: Jan. 8, 2009

(65) Prior Publication Data
US 2010/0099019 A1    Apr. 22, 2010

(30) Foreign Application Priority Data

Jul. 4, 2007   (JP) .................................. 2007-176357

(51) Int. Cl.
*H01M 10/50*   (2006.01)

(52) U.S. Cl.
USPC ........................................................ 429/120

(58) Field of Classification Search
CPC .................... H01M 10/5004; H01M 10/5016; H01M 10/5067; H01M 10/5073; Y02E 60/12; B60K 1/04; B60K 2001/005; B60K 2001/0416
USPC ........................................................ 429/120
IPC .... B60K 11/06, 1/04; H01M 10/50; B60H 1/00
See application file for complete search history.

(56) References Cited

U.S. PATENT DOCUMENTS

| 5,937,664 A | 8/1999 | Matsuno et al. |
| 2005/0028542 A1* | 2/2005 | Yoshida et al. ................. 62/186 |

(Continued)

FOREIGN PATENT DOCUMENTS

| JP | A-5-169981 | 7/1993 |
| JP | A-10-306722 | 11/1998 |

(Continued)

OTHER PUBLICATIONS

International Search Report issued in International Application No. PCT/JP2008/060101; Mailed Jul. 1, 2008.

(Continued)

*Primary Examiner* — Basia Ridley
*Assistant Examiner* — Heng Chan
(74) *Attorney, Agent, or Firm* — Oliff PLC

(57) ABSTRACT

A battery cooling structure includes: a battery provided in a luggage room of a vehicle; an air intake duct, including an air inlet open in a vehicular cabin, for supplying air in the vehicular cabin to the battery as cooling air; and a partition panel standing away from a rear seat with a clearance therebetween so as to section the luggage room and the vehicular cabin and provided with a duct hole in which the air intake duct is inserted. The partition panel is provided with an air exhaust hole for exhausting air in the luggage room to the vehicular cabin. The air exhaust hole is formed at a location spaced away from the duct hole. Such a configuration provides a battery cooling structure suppressing an adverse effect caused by exhaust of heated cooling air.

5 Claims, 4 Drawing Sheets

(56) References Cited

U.S. PATENT DOCUMENTS

| | | |
|---|---|---|
| 2005/0056035 A1 | 3/2005 | Smith |
| 2007/0040418 A1 | 2/2007 | Ohkuma et al. |
| 2008/0196957 A1 | 8/2008 | Koike et al. |
| 2008/0296075 A1* | 12/2008 | Zhu et al. .................. 180/68.1 |

FOREIGN PATENT DOCUMENTS

| | | |
|---|---|---|
| JP | A-2002-166728 | 6/2002 |
| JP | A-2002-231321 | 8/2002 |
| JP | A-2004-1683 | 1/2004 |
| JP | A-2004-158202 | 6/2004 |
| JP | A-2005-94928 | 4/2005 |
| JP | A-2008-132855 | 6/2006 |
| JP | A-2006-182044 | 7/2006 |
| JP | A-2006-188182 | 7/2006 |
| JP | A-2007-8443 | 1/2007 |
| JP | A-2007-22350 | 2/2007 |
| JP | A-2007-153053 | 6/2007 |
| JP | A-2007-314139 | 12/2007 |
| JP | A-2008-62780 | 3/2008 |
| JP | A-2008-141945 | 6/2008 |

OTHER PUBLICATIONS

Nov. 9, 2011 Office Action issued in German Patent Application No. 11 2008 001 570.8 (with translation).

* cited by examiner

BATTERY COOLING STRUCTURE

TECHNICAL FIELD

The present invention generally relates to a battery cooling structure, more particularly, a battery cooling structure installed in a luggage room of a vehicle.

BACKGROUND ART

Regarding conventional battery cooling structures, for example, Japanese Patent Laying-open No. 2004-1683 (Patent Document 1) discloses a vehicular battery cooling structure to prevent deterioration of battery characteristics and short life thereof. The vehicular battery cooling structure disclosed in Patent Document 1 includes an air intake duct connected to a battery pack, and an air sending fan distributing cooling air to the air intake duct in order to cool the battery pack. The air intake duct is provided with an air inlet located above a tonneau cover for covering a luggage placed in a luggage room.

Further, Japanese Patent Laying-open No. 5-169981 (Patent Document 2) discloses a device, provided in an electric car, for cooling a battery mounted therein by means of external air drawn in from a front end portion of the car body. In Patent Document 2, the electric car is provided with a hollow side frame extending from the front end portion to the rear end portion of the car body. The side frame has a front end portion in which an opening is provided to draw in the external air therethrough, and the external air thus drawn in passes through a battery storage room and thereafter is exhausted from an opening provided in the rear end portion of the side frame.

Further, Japanese Patent Laying-open No. 2006-182044 (Patent Document 3) discloses a high voltage battery unit mounting vehicular structure by which a high voltage battery having a particularly large capacitance can be mounted on a vehicle. In Patent Document 3, the high voltage battery is disposed on a rear floor panel of the rear portion of a fuel battery vehicle.

Furthermore, Japanese Patent Laying-open No. 2002-231321 (Patent Document 4) discloses a vehicular battery cooling device achieving improved cooling efficiency without complicating the structure of an air outlet of an air exhaust duct. In Patent Document 4, the air outlet of the air exhaust duct is provided between a deck side trim and an outer body to exhaust the air after cooling the battery.

In Patent Document 1 described above, air in the vehicular cabin is introduced into the luggage room as cooling air to cool the battery pack generating heat due to charging and discharging. In this case, continuous airflow from the vehicular cabin to the luggage room causes internal pressure drop in the vehicular cabin, whereby the air in the luggage room may be brought back to the vehicular cabin. The air in the luggage room has a high temperature due to influences of the battery pack generating heat and the cooling air exhausted from the battery pack. When such high temperature air is brought back to the vehicular cabin, an occupant in the vehicular cabin may feel unpleasant about the flow of such air, or the high temperature air may be drawn into the luggage room again to decrease the cooling efficiency of the battery pack.

DISCLOSURE OF THE INVENTION

An object of the present invention is to solve the above-described problems, and to provide a battery cooling structure for suppressing an adverse effect resulting from exhaust of heated cooling air.

A battery cooling structure according to the present invention includes: a battery provided in a luggage room of a vehicle; an air intake duct, including an air inlet open in a vehicular cabin, for supplying air in the vehicular cabin to the battery as cooling air; and a partition panel standing away from a rear seat with a clearance therebetween so as to section the luggage room and the vehicular cabin and provided with a duct hole in which the air intake duct is inserted. The partition panel is provided with an air exhaust hole for exhausting air in the luggage room to the vehicular cabin. The air exhaust hole is formed at a location spaced away from the duct hole.

According to the battery cooling structure thus configured, in the partition panel standing away from the rear seat with the clearance therebetween, the air exhaust hole is formed. Accordingly, the air exhausted from the luggage room via the air exhaust hole flows in the clearance between the rear seat and the partition panel and is then brought back to the vehicular cabin. This causes dispersion of the air, and then the air is brought back to the vehicular cabin. Hence, an occupant in the vehicular cabin can be prevented from feeling unpleasant about the high temperature air. Further, the air exhaust hole is formed at the location spaced away from the duct hole. Accordingly, the high temperature air exhausted from the air exhaust hole is less likely to be drawn immediately from the air inlet, whereby decrease of cooling efficiency of the battery can be prevented. Thus, according to the present invention, an adverse effect caused by exhaust of heated cooling air can be suppressed.

Further, it is preferable that the air exhaust hole be formed at a location higher than the location of the air inlet. According to the battery cooling structure thus configured, the high temperature air exhausted from the air exhaust hole is less likely to travel toward the air inlet, thus achieving further effective suppression of decrease of cooling efficiency of the battery.

Further, it is preferable that the air inlet and the air exhaust hole be positioned opposite to each other with respect to a center line in a vehicular width direction of the vehicle. According to the battery cooling structure thus configured, the air inlet and the air exhaust hole are positioned away from each other in the vehicular width direction. Accordingly, the air exhausted from the air exhaust hole is less likely to be drawn via the air inlet.

Further, it is preferable that the air intake duct include a first portion and a second portion divided by the luggage room and connected to each other. According to the battery cooling structure thus configured, with the first portion and the second portion separated, the battery can be installed in the luggage room to improve workability upon installing the battery.

Further, it is preferable that the battery cooling structure further includes: a fan for distributing the cooling air to the air intake duct; and a frame member, provided in the luggage room, for reinforcing a body of the vehicle. The fan is fixed to the frame member. According to the battery cooling structure thus configured, with the fan fixed to a highly rigid frame member, the vibration of the fan can be prevented from being transferred to the vehicular main body.

As described above, according to the present invention, a battery cooling structure suppressing an adverse effect caused by exhaust of heated cooling air can be provided.

BEST MODE FOR CARRYING OUT THE INVENTION

Figure 1:
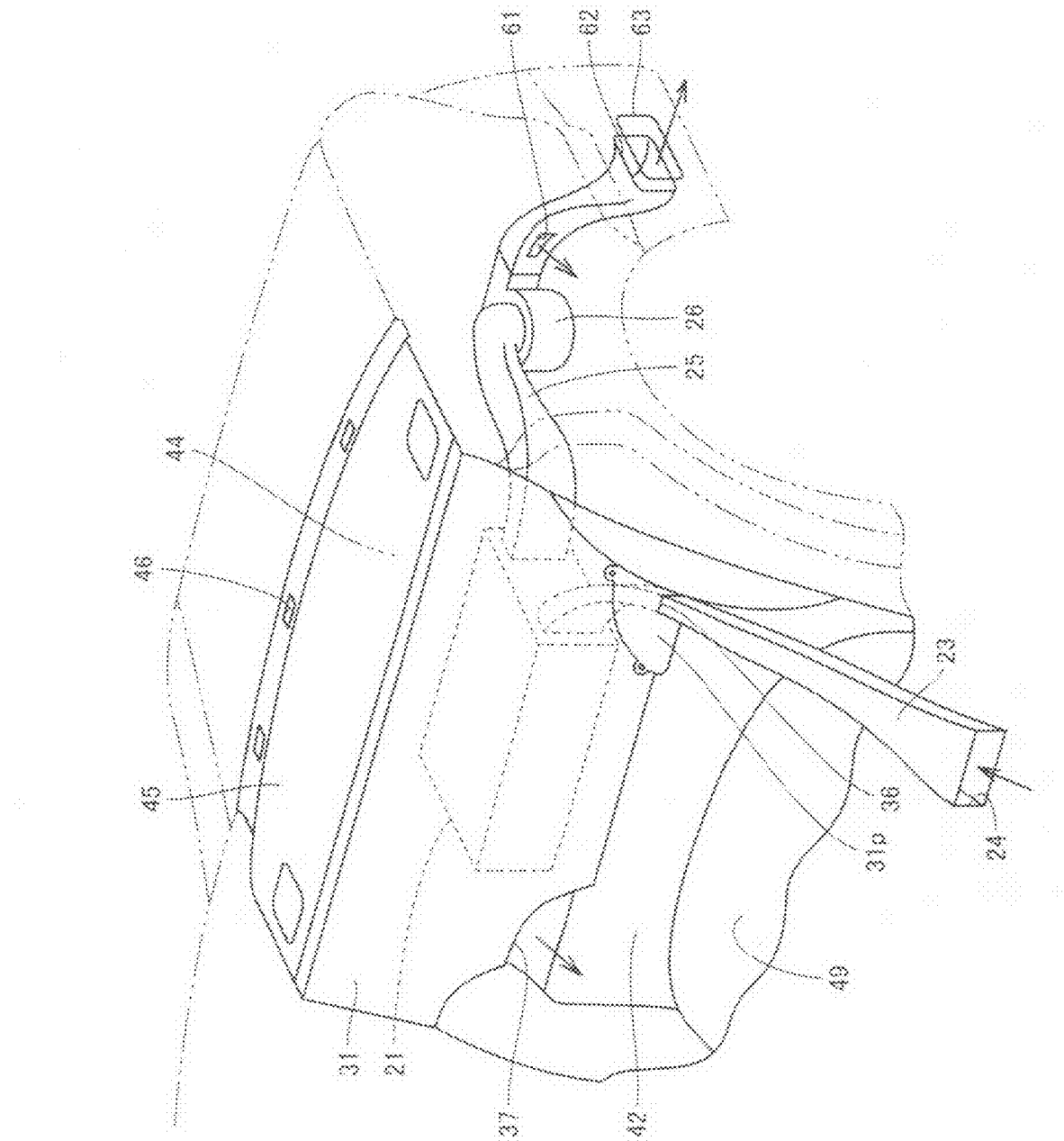
FIG. 1 is a perspective view showing a hybrid car to which a battery cooling structure of an embodiment of the present invention is applied.

Embodiments of the present invention will be described with reference to figures. It should be noted that the same or equivalent members are given the same reference characters in the figures referenced below.

Figure 2:
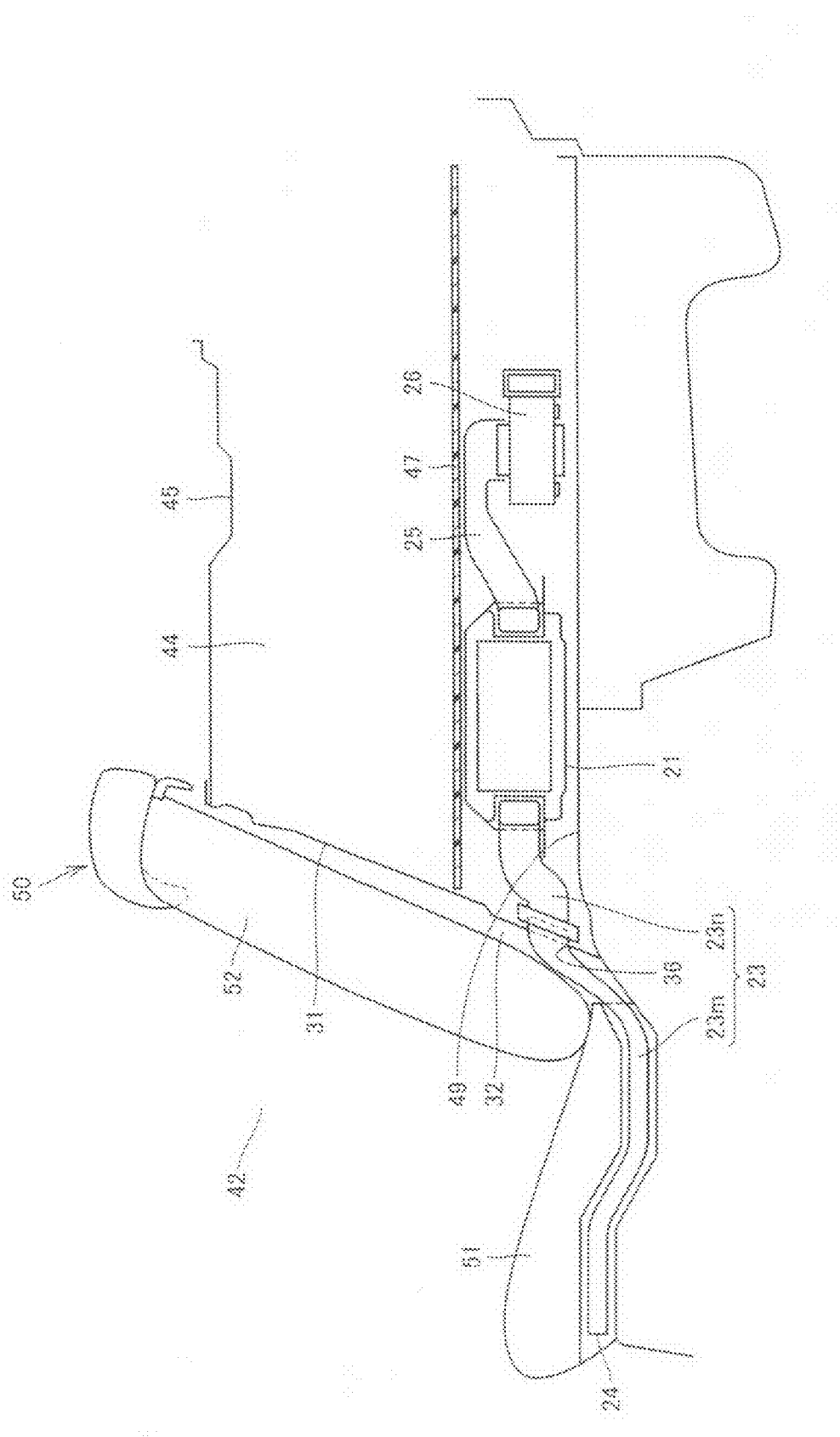
FIG. 2 is a cross sectional view of the hybrid car shown in FIG. 1.

FIG. 1 is a perspective view showing a hybrid car to which a battery cooling structure of an embodiment of the present invention is applied. In FIG. 1, surroundings of a luggage room of the hybrid car are shown but its rear seat is not illustrated therein. FIG. 2 is a cross sectional view of the hybrid car of FIG. 1.

Referring to FIG. 1 and FIG. 2, the hybrid car, serving as a vehicle, employs an internal combustion engine such as a gasoline engine or a diesel engine and a vehicle driving motor as motive power sources.

In the hybrid car, a vehicular cabin 42 and a luggage room 44 are formed. Vehicular cabin 42 is a space in which an occupant resides. Vehicular cabin 42 is provided with a rear seat 50. Rear seat 50 is positioned on a floor 49 that is a bottom portion of the vehicle. Rear seat 50 includes a base portion 51 on which an occupant sits, and a backrest portion 52 on which the occupant leans with his/her back. Luggage room 44 is a space for mainly loading a luggage therein. Luggage room 44 is formed in a rear portion of the vehicle.

Vehicular cabin 42 and luggage room 44 are sectioned by a partition panel 31 and an upper back panel 45. Partition panel 31 is positioned adjacent to rear seat 50. Partition panel 31 stands on floor 49. Between partition panel 31 and rear seat 50, a clearance 32 is formed. Between partition panel 31 and backrest portion 52, clearance 32 is formed. Clearance 32 extends in a flat plane behind backrest portion 52. Partition panel 31 is positioned in the forward side of the vehicle relative to luggage room 44. Partition panel 31 extends in a plate-like manner in the vehicular width direction.

Partition panel 31 is formed from a metal plate. Partition panel 31 blocks heat and noise between vehicular cabin 42 and luggage room 44 and increases rigidity of the vehicular body to improve driving stability of the vehicle.

Upper back panel 45 extends in generally the horizontal direction. Upper back panel 45 is positioned in luggage room 44 at the upper side in the vertical direction. Upper back panel 45 is provided with an air vent hole 46. Air vent hole 46 communicates between vehicular cabin 42 and luggage room 44. Via air vent hole 46, air in vehicular cabin 42 is exhausted from a vent grille 63.

The hybrid car includes a battery 21. Battery 21 is contained in luggage room 44. Battery 21 is used for traveling of the hybrid car. Battery 21 supplies electric power to the vehicle driving motor installed in the hybrid car. Battery 21 is not particularly limited as long as it is a chargeable/dischargeable secondary battery. For example, battery 21 may be a nickel hydrogen battery or a lithium ion battery.

In the hybrid car in the present embodiment, when driving the vehicle driving motor, direct current discharged from battery 21 is converted by an inverter into alternating current, which is then supplied to the motor. When the motor is functioned as a generator to perform energy regeneration, alternating current generated by the motor is converted by the inverter into direct current, which then charges battery 21.

The hybrid car includes an air intake duct 23. Air intake duct 23 extends between vehicular cabin 42 and battery 21 provided in luggage room 44. Air intake duct 23 passes through partition panel 31. Air intake duct 23 runs within luggage room 44. Air intake duct 23 runs under rear seat 50. Air intake duct 23 runs in a clearance between base portion 51 and floor 49. Air intake duct 23 extends in the front-back direction of the vehicle.

Air intake duct 23 includes an air inlet 24. Air inlet 24 is open in vehicular cabin 42. Air inlet 24 is open in a space at the foot of rear seat 50. The space at the foot of rear seat 50 is less likely to be affected by direct sunlight and therefore has a low temperature in general. Hence, such low temperature air can be introduced to battery 21 as cooling air.

In partition panel 31, a duct hole 36 is formed. Duct hole 36 is formed in partition panel 31 at its one end in the vehicular width direction. Duct hole 36 is formed at a lower end of partition panel 31. Partition panel 31 includes a panel portion 31p. Panel portion 31p is detachably attachable to partition panel 31. Duct hole 36 is formed in panel portion 31p.

The hybrid car includes an air exhaust duct 25. Air exhaust duct 25 extends between battery 21 and a space between a trim (interior) of luggage room 44 and the body. Air exhaust duct 25 is arranged in luggage room 44. Air exhaust duct 25 includes air outlets 61 and 62. Air outlet 61 is open in luggage room 44. Air outlet 62 is open in the space between the trim of luggage room 44 and the body.

The hybrid car includes a fan 26. Fan 26 distributes cooling air to air intake duct 23 and air exhaust duct 25 in order to cool battery 21. Fan 26 is positioned on a path of air exhaust duct 25. Fan 26 is positioned in luggage room 44. Fan 26 is an electrically driven sirocco fan that draws air from the central portion of the rotary fan in the rotation axis direction and exhausts the cooling air radially with respect to the rotation axis. Fan 26 is a pull-in type fan that draws cooling air from battery 21.

It should be noted that fan 26 is not limited to the sirocco fan but may be, for example, a cross flow fan or a propeller fan. Fan 26 may be a push type fan for supplying cooling air to battery 21.

When fan 26 is driven, air in vehicular cabin 42 is drawn into air intake duct 23 via air inlet 24. The air passes through air intake duct 23 and is then introduced to battery 21 as cooling air. The cooling air cools battery 21, is heated accordingly, and passes through air exhaust duct 25. A part of the air is exhausted to luggage room 44 via air outlet 61, and the rest thereof is exhausted to outside the car via air outlet 62 and vent grille 63.

In partition panel 31, an air exhaust hole 37 is formed. Air exhaust hole 37 communicates between vehicular cabin 42 and luggage room 44. Air exhaust hole 37 is formed on the other end of partition panel 31 in the vehicular width direction. Air exhaust hole 37 is formed at a lower end of partition panel 31. Air exhaust hole 37 is positioned away from duct hole 36. Air exhaust hole 37 and duct hole 36 are formed away from each other in the vehicular width direction. Air exhaust hole 37 is formed away from air inlet 24. Relative to the center line of the hybrid car in the vehicular width direction, air inlet 24 is located at one side and air exhaust hole 37 is located at the other side. Air exhaust hole 37 has an opening area larger than that of air vent hole 46.

The temperature of air in luggage room 44 is increased by the high temperature cooling air exhausted via air outlet 61 and influence of heat generated by battery 21. Meanwhile, when air in vehicular cabin 42 continues to be drawn via air inlet 24, the internal pressure in vehicular cabin 42 is decreased, resulting in an adverse effect over air conditioning or the like. Hence, in the present embodiment, the air in luggage room 44 is brought back to vehicular cabin 42 via air exhaust hole 37.

On this occasion, air exhaust hole 37 formed in partition panel 31 allows air exhausted from air exhaust hole 37 to first flow into clearance 32 between rear seat 50 and partition panel 31. The air flows in clearance 32, and is let out to vehicular cabin 42 from between rear seat 50 and interior components (a trim, a carpet, and the like). Such a process allows the air in luggage room 44 to be dispersed and brought back to vehicular cabin 42, which can prevent the high temperature airflow from making an occupant of vehicular cabin 42 feel unpleasant. Further, mainly via air exhaust hole 37, the air is exhausted from luggage room 44 to vehicular cabin 42. This can prevent the air in luggage room 44 from flowing thereinto via air vent hole 46 that is substantially as high as the head of an occupant sitting on rear seat 50.

Further, air exhaust hole 37 is formed at a location spaced away from duct hole 36 and higher than the location of air inlet 24. By arranging them in this way, a configuration in which air exhaust hole 37 and air inlet 24 are positioned distant away from each other can be readily obtained. Further, the high temperature air exhausted from air exhaust hole 37 is less likely to travel from high to low. For these reasons, according to the present embodiment, air exhausted from air exhaust hole 37 can be effectively prevented from being reintroduced to battery 21 via air inlet 24.

The battery cooling structure of the embodiment of the present invention includes: battery 21 provided in luggage room 44 of the hybrid car serving as a vehicle; air intake-duct 23, including air inlet 24 open in vehicular cabin 42, for supplying air in vehicular cabin 42 to battery 21 as cooling air; and partition panel 31 standing away from rear seat 50 with clearance 32 therebetween to section luggage room 44 and vehicular cabin 42 and provided with duct hole 36 to which air intake duct 23 is inserted. Partition panel 31 is provided with air exhaust hole 37 for exhausting air in luggage room 44 to vehicular cabin 42. Air exhaust hole 37 is formed at a location spaced away from duct hole 36.

According to the battery cooling structure thus configured in the embodiment of the present invention, even though high temperature air is exhausted from luggage room 44 to vehicular cabin 42, pleasantness in vehicular cabin 42 can be maintained. Further, since the air exhausted from luggage room 44 is prevented from being drawn immediately to air intake duct 23, cooling efficiency of battery 21 can be improved.

Now, the cooling structure of the hybrid car of FIG. 1 and FIG. 2 will be described more in detail. Referring to FIG. 2, the hybrid car includes a deck board 47. Deck board 47 is provided in luggage room 44. Deck board 47 extends in generally the horizontal direction. On deck board 47, a luggage is placed. Below deck board 47, air intake duct 23, air exhaust duct 25, and fan 26 are provided.

In the present embodiment, based on the ground level, the maximal heights of air intake duct 23, air exhaust duct 25, and fan 26 are equal to or lower than the maximal height of battery 21. With such a configuration, no component protrudes higher than the height of battery 21, so a large capacity can be secured in luggage room 44.

Figure 3:
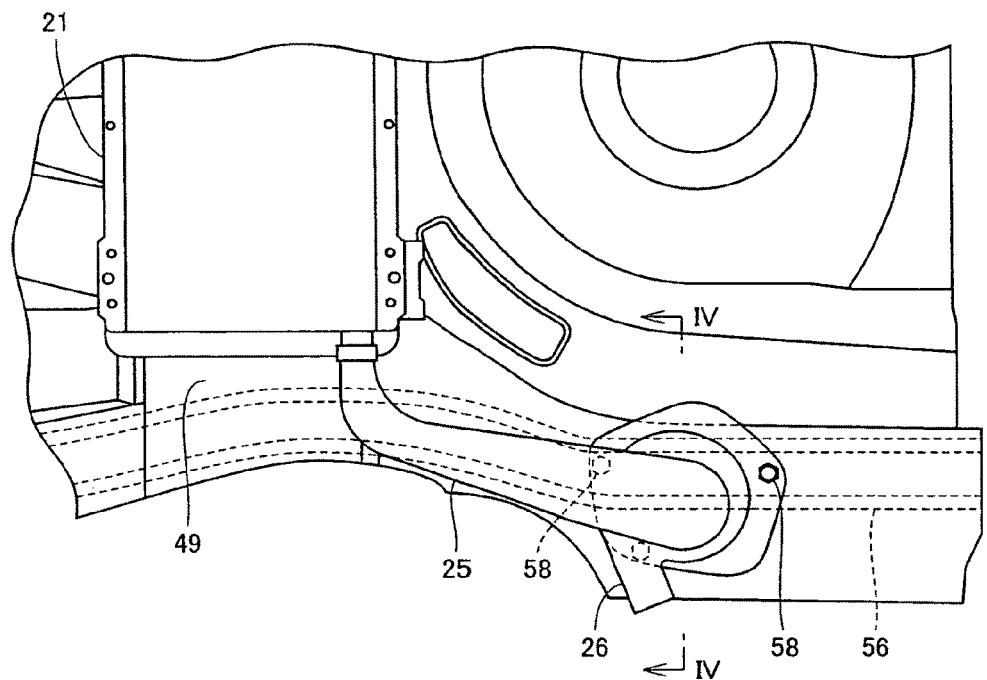
FIG. 3 is a plan view of a mounted structure of a fan shown in FIG. 1.
Figure 4:
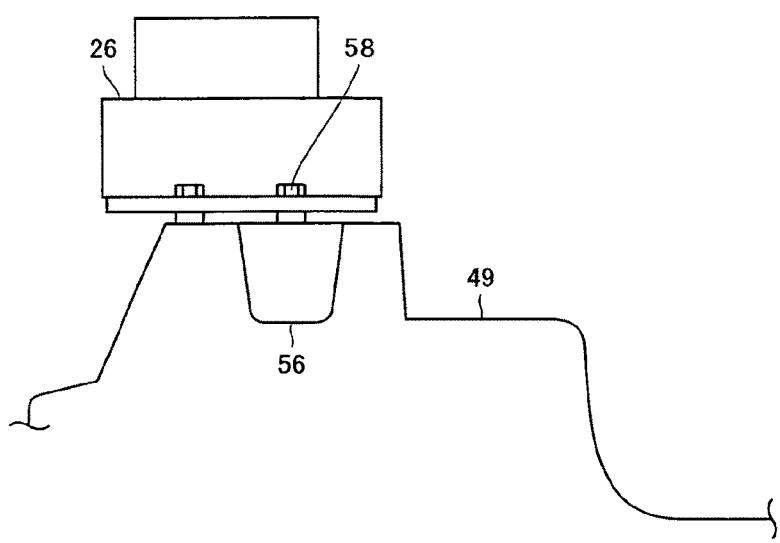
FIG. 4 is a cross sectional view of the hybrid car taken along a line IV-IV in FIG. 3.

FIG. 3 is a plan view showing a mounted structure of the fan in FIG. 1. FIG. 4 is a cross sectional view of the hybrid car taken along a line IV-IV in FIG. 3. Referring to FIG. 3 and FIG. 4, the hybrid car includes side members 56. Side members 56 are provided on floor 49. Side members 56 extend in the front-back direction of the vehicle. Side members 56 are provided in the opposing ends of floor 49 in the vehicular width direction respectively. Each of side members 56 is a frame member for reinforcing the body of the hybrid car. Side member 56 is a frame member for reinforcing floor 49.

In the present embodiment, fan 26 is fixed to side member 56. Fan 26 is fastened to side member 56 by bolts 58. Since side member 56 is highly rigid, such a configuration can suppress transfer of vibration from fan 26 to the vehicular main body. This achieves improved NV (noise and vibration) property of the hybrid car. Also, a vibration isolating elastic body interposed between fan 26 and the vehicular main body can be omitted, thus allowing for cost reduction.

Figure 5:
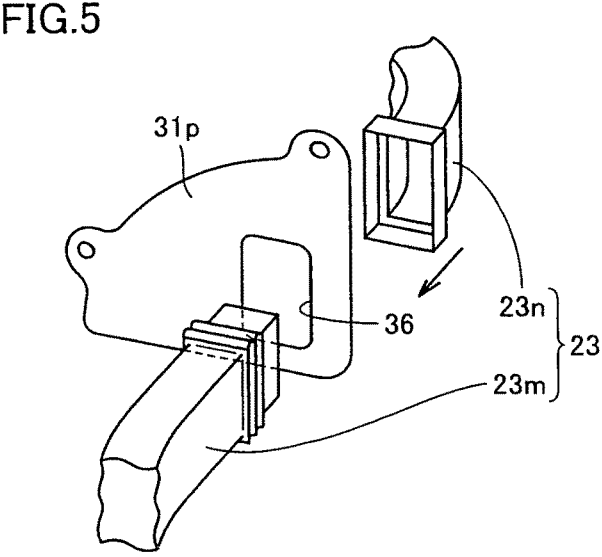
FIG. 5 is an exploded view of a partition panel shown in FIG. 1.

FIG. 5 is an exploded view of the partition panel in FIG. 1. Referring to FIG. 2 and FIG. 5, in the present embodiment, air intake duct 23 includes a duct portion 23$m$ and a duct portion 23$n$. Duct portion 23$m$ and duct portion 23$n$ are divided by luggage room 44 but are jointed to each other. Duct portion 23$m$ includes air inlet 24. When duct portion 23$m$ is inserted into duct hole 36, duct portion 23$m$ is in one piece with panel portion 31$p$. Duct portion 23$n$ is connected to battery 21.

With such a configuration, in a step of assembling battery 21, battery 21 to which only duct portion 23$n$ is connected is installed in luggage room 44, and thereafter duct portion 23$n$ and duct portion 23$m$ are connected. In other words, in the present embodiment, a step of installing battery 21 and a step of inserting duct 23 into partition panel 31 can be performed separately. This allows improved workability upon the assembling of battery 21.

Figure 6:
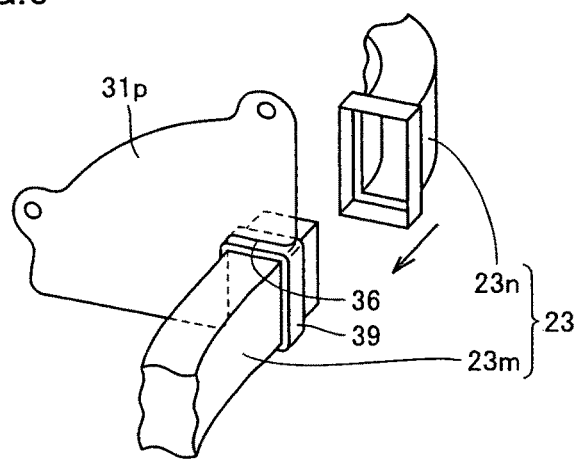
FIG. 6 is a perspective view of a variation of an air intake duct shown in FIG. 5.

FIG. 6 is a perspective view showing a variation of the air intake duct in FIG. 5. Referring to FIG. 6, in this variation, panel portion 31$p$ and duct portion 23$m$ are provided as separate members. To secure air-tightness between luggage room 44 and vehicular cabin 42, a sealing member 39 is inserted in a clearance between the circumferential edge of duct hole 36 and duct portion 23$m$. In such a configuration, the aforementioned advantage can be obtained as well.

It should be noted that the present invention is applicable to a fuel battery hybrid vehicle (FCHV: Fuel Cell Hybrid Vehicle) employing a fuel battery and a battery as motive power sources or to an electric vehicle (EV). In the hybrid car in the present embodiment, the internal combustion engine is driven at a fuel consumption optimum operation point, whereas in the fuel battery hybrid vehicle, the fuel battery is driven at a power generation optimum operation point. Note also that both the hybrid vehicles are basically the same in terms of use of batteries.

The embodiment disclosed herein is illustrative and non-restrictive in any respect. The scope of the present invention is defined by the scope of claims rather than the above description, and is intended to include any modifications within the scope and meaning equivalent to the terms of the claims.

INDUSTRIAL APPLICABILITY

The present invention is mainly used for a hybrid vehicle employing an internal combustion engine and a vehicle driving motor as motive power sources, a fuel battery hybrid vehicle employing a fuel battery and a battery as motive power sources, an electric vehicle, and the like.

The invention claimed is:
1. A battery cooling structure, comprising:
a battery provided in a luggage room of a vehicle;

an air intake duct, including an air inlet open in a vehicular cabin, for supplying air in the vehicular cabin to said battery as cooling air; and a partition panel standing away from a rear seat with a clearance between the partition panel and the rear seat so as to section the luggage room and the vehicular cabin and provided with a duct hole in which said air intake duct is inserted, said partition panel being provided with an air exhaust hole for exhausting air in the luggage room to the vehicular cabin, said air exhaust hole being formed at a location (i) spaced away from said duct hole and (ii) positioned to be located behind the rear seat so that the air exhausted from the air exhaust hole is exhausted into the clearance.

2. The battery cooling structure according to claim 1, wherein said air exhaust hole is formed at a location higher than a location of said air inlet.

3. The battery cooling structure according to claim 1, wherein said air inlet and said air exhaust hole are positioned opposite to each other with respect to a center line in a vehicular width direction of the vehicle.

4. The battery cooling structure according to claim 1, wherein said air intake duct includes a first portion and a second portion divided by the luggage room and connected to each other.

5. The battery cooling structure according to claim 1, further comprising:

a fan for distributing the cooling air to said air intake duct; and a frame member, provided in the luggage room, for reinforcing a body of the vehicle, said fan being fixed to said frame member.

* * * * *